United States Patent
Houck et al.

(10) Patent No.: US 12,196,611 B2
(45) Date of Patent: Jan. 14, 2025

(54) CONCEALMENT COMPONENT FOR AN OPTICAL SENSOR DEVICE

(71) Applicant: VIAVI Solutions Inc., San Jose, CA (US)

(72) Inventors: William D. Houck, Santa Rosa, CA (US); Fred Van Milligen, Santa Rosa, CA (US)

(73) Assignee: VIAVI Solutions Inc., Chandler, AZ (US)

(*) Notice: Subject to any disclaimer, the term of this patent is extended or adjusted under 35 U.S.C. 154(b) by 104 days.

(21) Appl. No.: 17/657,233

(22) Filed: Mar. 30, 2022

(65) Prior Publication Data

US 2023/0314213 A1 Oct. 5, 2023

(51) Int. Cl.
*G01J 3/02* (2006.01)
*G01J 1/04* (2006.01)
*G01J 1/42* (2006.01)
*G01J 3/12* (2006.01)
*G01J 3/28* (2006.01)
(Continued)

(52) U.S. Cl.
CPC ........... *G01J 3/0205* (2013.01); *G01J 1/0474* (2013.01); *G01J 1/4204* (2013.01); *G01J 3/0229* (2013.01); *G01J 3/0294* (2013.01); *G01J 3/28* (2013.01); *G01J 3/2803* (2013.01); *G01J 3/42* (2013.01); *G02B 5/02* (2013.01); *G02B 5/20* (2013.01); *G02B 5/201* (2013.01); *G01J 1/0492* (2013.01); *G01J 1/4228* (2013.01);
(Continued)

(58) Field of Classification Search
CPC .... G01J 3/0205; G01J 3/42; G01J 2003/1213; G02B 5/201

USPC .......................................................... 356/434
See application file for complete search history.

(56) References Cited

U.S. PATENT DOCUMENTS 8,284,401 B2 * 10/2012 Choi ..................... G01J 3/0283
356/419
9,500,523 B2 * 11/2016 Goldring ............... G01J 3/2803
(Continued)

FOREIGN PATENT DOCUMENTS

EP 3860112 A1 8/2021
WO 2015015493 A2 2/2015
WO 2016125165 A2 8/2016

OTHER PUBLICATIONS

Extended European Search Report for Application No. EP23158613.2, mailed on Aug. 8, 2023, 11 Pages.

*Primary Examiner* — Michelle M Iacoletti
*Assistant Examiner* — Noah J. Haney
(74) *Attorney, Agent, or Firm* — Harrity & Harrity, LLP

(57) ABSTRACT

A concealment component for an optical sensor device includes an optical filter and one or more diffusive optical structures. The one or more diffusive optical structures are configured to distribute light in a diffused pattern on an input surface of the optical filter. The optical filter is configured to pass a first set of light beams, of the light distributed in the diffused pattern on the input surface of the optical filter, that are associated with a particular wavelength range, and prevent a second set of light beams, of the light distributed in the diffused pattern on the input surface of the optical filter, that are not associated with the particular wavelength range, from passing. Preventing the second set of light beams from passing is to cause the second set of light beams to be directed away from or absorbed by the concealment component in a concealment pattern.

20 Claims, 11 Drawing Sheets

(51) Int. Cl.
*G01J 3/42* (2006.01)
*G02B 5/02* (2006.01)
*G02B 5/20* (2006.01)

(52) U.S. Cl.
CPC ............... *G01J 2003/1213* (2013.01); *G01J 2003/2806* (2013.01); *G01J 2003/2826* (2013.01)

(56) References Cited

U.S. PATENT DOCUMENTS

| | | | |
|---|---|---|---|
| 10,048,127 B2* | 8/2018 | Smith | G01J 3/0205 |
| 10,345,151 B1 | 7/2019 | Sarkar et al. | |
| 10,475,937 B1* | 11/2019 | Jones | H01L 31/173 |
| 10,948,640 B2 | 3/2021 | Ockenfuss et al. | |
| 11,054,556 B2* | 7/2021 | Wheatley | G02B 5/22 |
| 2012/0170284 A1 | 7/2012 | Shedletsky | |
| 2014/0160253 A1* | 6/2014 | Backman | H04N 23/11 |
| | | | 250/226 |
| 2016/0232828 A1 | 8/2016 | Jia et al. | |
| 2017/0089757 A1 | 3/2017 | Geiger et al. | |
| 2017/0286743 A1* | 10/2017 | Lee | G06V 40/1318 |
| 2019/0025481 A1* | 1/2019 | Du | G02B 5/206 |
| 2019/0033502 A1* | 1/2019 | Du | G02B 5/208 |
| 2019/0080668 A1 | 3/2019 | Holenarsipur et al. | |
| 2020/0264354 A1* | 8/2020 | Sharma | H04B 10/506 |
| 2021/0080632 A1* | 3/2021 | Sharma | G02B 5/0242 |
| 2021/0372853 A1* | 12/2021 | Borremans | G01J 3/2823 |
| 2022/0357205 A1* | 11/2022 | Wheatley | G01N 21/31 |

* cited by examiner

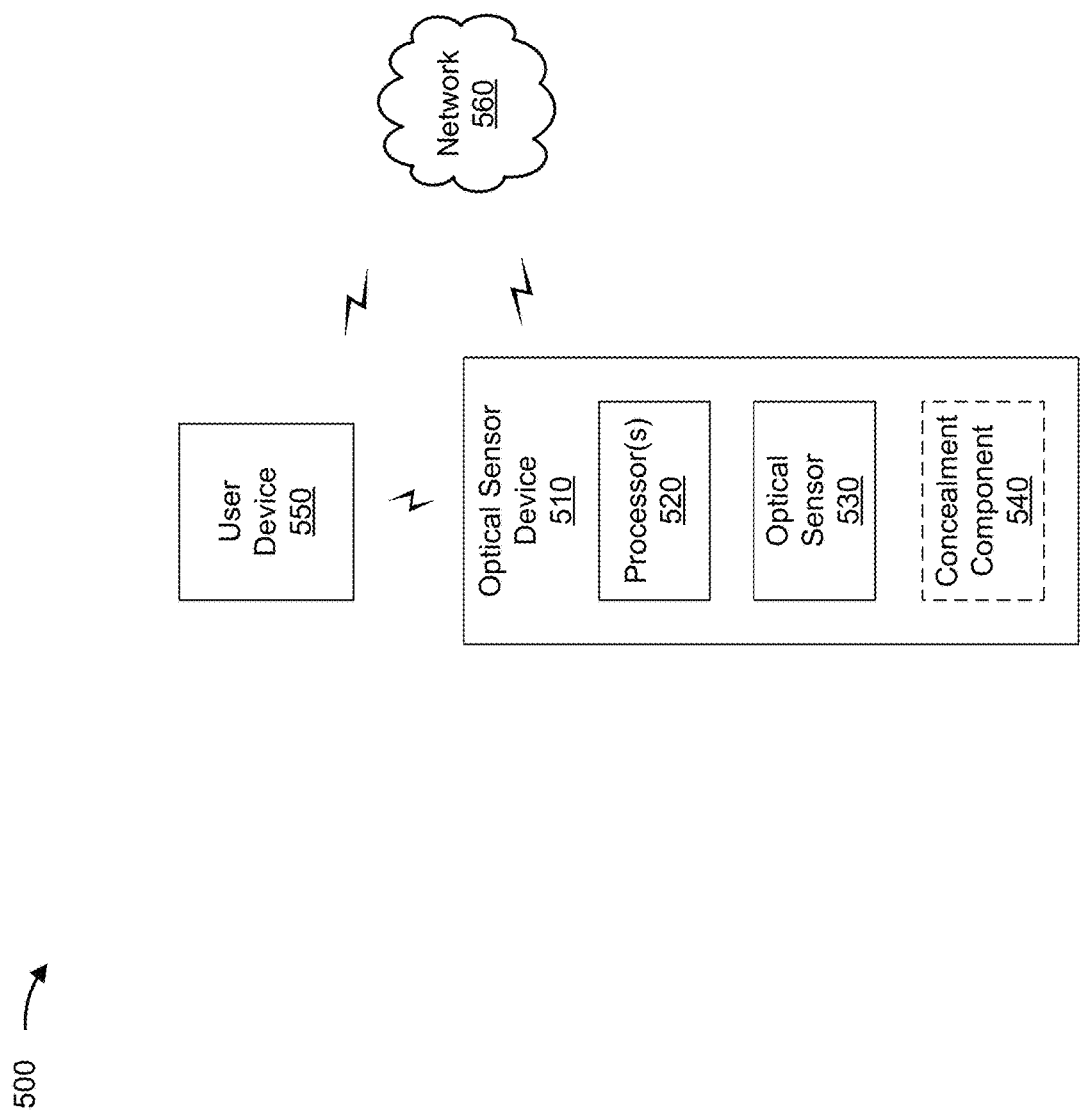

CONCEALMENT COMPONENT FOR AN OPTICAL SENSOR DEVICE

BACKGROUND

An optical sensor device may be utilized to capture information concerning light. For example, the optical sensor device may capture information relating to a set of wavelengths associated with the light. The optical sensor device may include a set of sensor elements (e.g., optical sensors, spectral sensors, and/or image sensors) that capture the information. For example, an array of sensor elements may be utilized to capture information relating to multiple wavelengths. The sensor element array may be associated with an optical filter. The optical filter may include one or more channels that respectively pass particular wavelengths to sensor elements of the sensor element array.

SUMMARY

In some implementations, an optical sensor device includes an optical sensor that includes a plurality of sensor elements; a concealment component that includes: an optical filter, and one or more diffusive optical structures; and one or more processors, wherein: the one or more diffusive optical structures of the concealment component are configured to distribute light associated with a scene in a diffused pattern on an input surface of the optical filter, and the optical filter is configured to: allow a first set of light beams, of the light distributed in the diffused pattern on the input surface of the optical filter, that are associated with a particular wavelength range to pass through the optical filter to the plurality of sensor elements of the optical sensor, and prevent a second set of light beams, of the light distributed in the diffused pattern on the input surface of the optical filter, that are not associated with the particular wavelength range, from passing through the optical filter, wherein preventing the second set of light beams from passing through the optical filter is to cause the second set of light beams to be directed away from or absorbed by the input surface of the optical filter in a concealment pattern.

In some implementations, an optical sensor device includes an optical sensor that includes a plurality of sensor elements; and a concealment component that includes: an optical filter, and one or more diffusive optical structures, wherein: the one or more diffusive optical structures of the concealment component are configured to distribute light associated with a scene in a diffused pattern on an input surface of the optical filter, and the optical filter is configured to: pass a first set of light beams, of the light distributed in the diffused pattern on the input surface of the optical filter, that are associated with a particular wavelength range to the plurality of sensor elements of the optical sensor, and prevent a second set of light beams, of the light distributed in the diffused pattern on the input surface of the optical filter, that are not associated with the particular wavelength range, from passing to the plurality of sensor elements of the optical sensor, wherein preventing the second set of light beams from passing to the plurality of sensor elements of the optical sensor is to cause the second set of light beams to be directed away from or absorbed by the concealment component in a concealment pattern.

In some implementations, a concealment component includes an optical filter; and one or more diffusive optical structures, wherein: the one or more diffusive optical structures of the concealment component are configured to distribute light in a diffused pattern on an input surface of the optical filter, and the optical filter is configured to: pass a first set of light beams, of the light distributed in the diffused pattern on the input surface of the optical filter, that are associated with a particular wavelength range, and prevent a second set of light beams, of the light distributed in the diffused pattern on the input surface of the optical filter, that are not associated with the particular wavelength range, from passing, wherein preventing the second set of light beams from passing is to cause the second set of light beams to be directed away from or absorbed by the concealment component in a concealment pattern.

BRIEF DESCRIPTION OF THE DRAWINGS

FIG. 5 is a diagram of an example environment in which systems and/or methods described herein may be implemented.

DETAILED DESCRIPTION

Figure 1A:
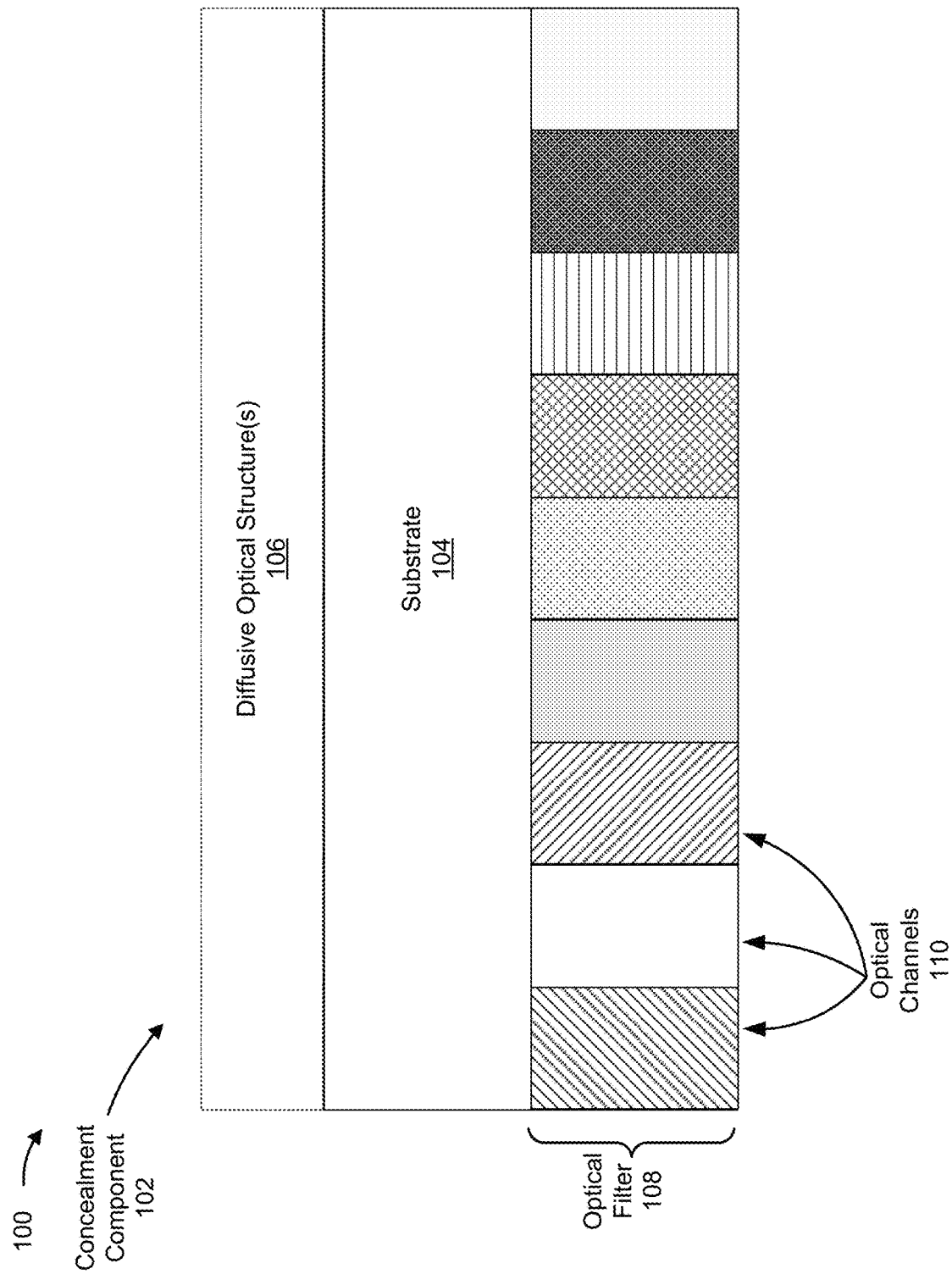
FIGS. 1A-1C are diagrams of an example implementation described herein.

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A conventional optical sensor device, such as a conventional spectrometer or a conventional imaging device, may include a lens, an optical filter, and an optical sensor to obtain light from a scene, filter the light, and process the light to determine spectral information associated with the scene or to generate an image of the scene. However, these components often reflect light (e.g., light is reflected at an input surface of the conventional optical sensor device and/or light is reflected by one or more components within the conventional optical sensor device) away from the conventional optical sensor. Consequently, an observer (e.g., a human observer, a smart camera device, or another device) may detect the reflected light and may determine a location and/or position of the conventional optical sensor device.

This may be unsightly or may detract from an appearance of an object associated with the conventional optical sensor device (e.g., reflected light from a conventional imaging device integrated into a body of a car may diminish a physical design aesthetic of the car). Further, in some cases, the conventional optical sensor device may be intended to be hidden or otherwise not noticeable to an observer (e.g., the conventional optical sensor device may be a security camera for a home, a chemical detection sensor for a public gathering space, or a surveillance camera for a neighborhood, among other examples) and detection of the conventional optical sensor device by the observer may reduce a likelihood that the observer will commit an action or exhibit a characteristic within a field of view of the conventional optical sensor device (e.g., the observer will act differently with knowledge of the conventional optical sensor device). Often, this thwarts the intended purpose of the conventional optical sensor device. Accordingly, computing resources (e.g., processing resources, memory resources, communication resources, and/or power resources, among other examples) to operate the conventional optical sensor device are wasted.

Some implementations described herein provide a concealment component for an optical sensor device. The concealment component includes one or more diffusive optical structures and an optical filter. The one or more diffusive optical structures are configured to distribute light (e.g., that is associated with a scene) in a diffused pattern on an input surface of the optical filter. The optical filter is configured to pass a first set of light beams, of the light distributed in the diffused pattern on the input surface of the optical filter, that are associated with a particular wavelength range. For example, the optical filter may be configured to pass infrared light from the scene to an optical sensor of the optical sensor device. The optical sensor obtains sensor data based on the first set of light beams, and one or more processors of the optical sensor device process the sensor device to determine spectral information and/or image information associated with the first set of light beams.

Moreover, the optical filter is configured to prevent a second set of light beams, of the light distributed in the diffused pattern on the input surface of the optical filter, that are not associated with the particular wavelength range, from passing. For example, the optical filter may be configured to prevent visible light from the scene from passing to the optical sensor. Further, the optical filter may cause the second set of light beams to be directed away from or absorbed by the optical filter in a concealment pattern. The concealment pattern may conceal or otherwise reduce a likelihood that the concealment component, the optical sensor, and/or the optical sensor device is perceptible to an observer of the concealment component, the optical sensor, and/or the optical sensor device. For example, when the second set of light beams are associated with visible light, the concealment pattern may appear (e.g., to a human observer) as a color and shade pattern that matches a color and shade pattern of a region of an object that is adjacent to the concealment component. Thus, the concealment component (and the optical sensor device) appear to "blend in" with the region of the object, making the concealment component (and the optical sensor device) less likely to be detected (e.g., by the human observer).

In some implementations, the diffusive optical structures may further diffuse the concealment pattern to create a diffused concealment pattern of the second set of light beams. In this way, a threshold amount (e.g., a majority, or more) of the second set of light beams that are directed away from the optical filter may be scattered in multiple directions away from the scene (e.g., the source of the light that includes the second set of light beams), and therefore an observer associated with the scene (e.g., a detection device positioned at the scene that emits the light to detect optical devices) may be less likely to detect the concealment component, the optical sensor, and/or the optical sensor device (e.g., because a minimal amount of the second set of light beams are directed toward and detected by the detection device). Further, the second set of light beams (e.g., in the concealment pattern and/or the diffused concealment pattern) may combine with other light from the scene that reflected off the diffusive optical structures (e.g., light that did not enter the optical sensor device), which may further conceal or otherwise reduce a likelihood that the concealment component, the optical sensor, and/or the optical sensor device are perceptible to an observer.

In this way, some implementations described herein reduce a likelihood that the concealment component, the optical sensor, and/or the optical sensor device will appear as unsightly or detract from an appearance of an object. Further, some implementations described herein may increase a likelihood that the optical sensor device stays hidden, or is otherwise not noticed by an observer, which reduces a likelihood that a would-be observer changes his or her behavior in a field of view of the optical sensor device. Accordingly, the optical sensor device is more likely to capture relevant information that is associated with an intended purpose of the optical sensor device (e.g., as a security camera, a chemical detection sensor, or a surveillance camera, among other examples) than that of a conspicuous conventional optical sensor device. This reduces a likelihood that computing resources (e.g., processing resources, memory resources, communication resources, and/or power resources, among other examples) used to operate the optical sensor device are wasted.

Figure 1B:
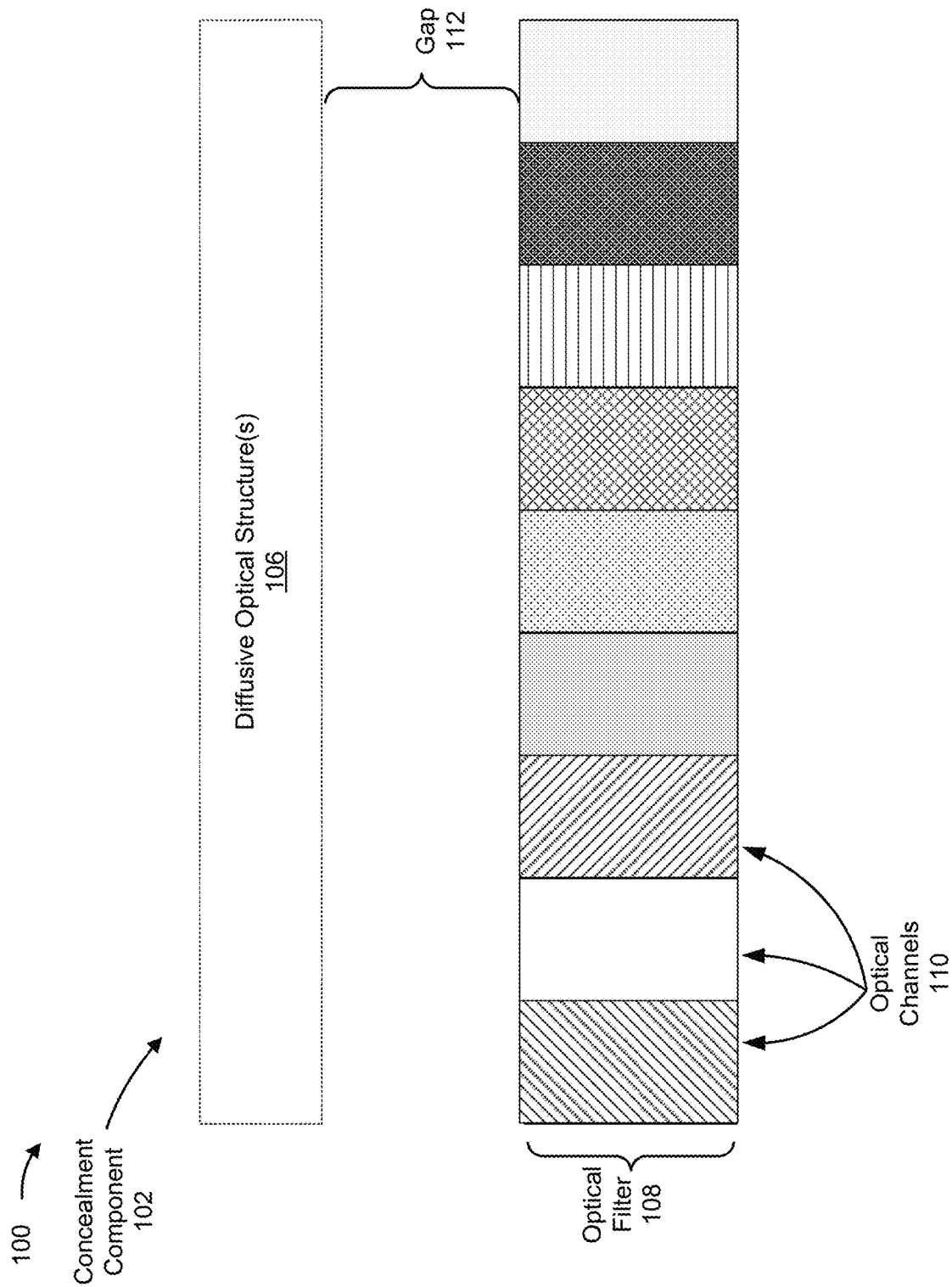
Figure 1C:
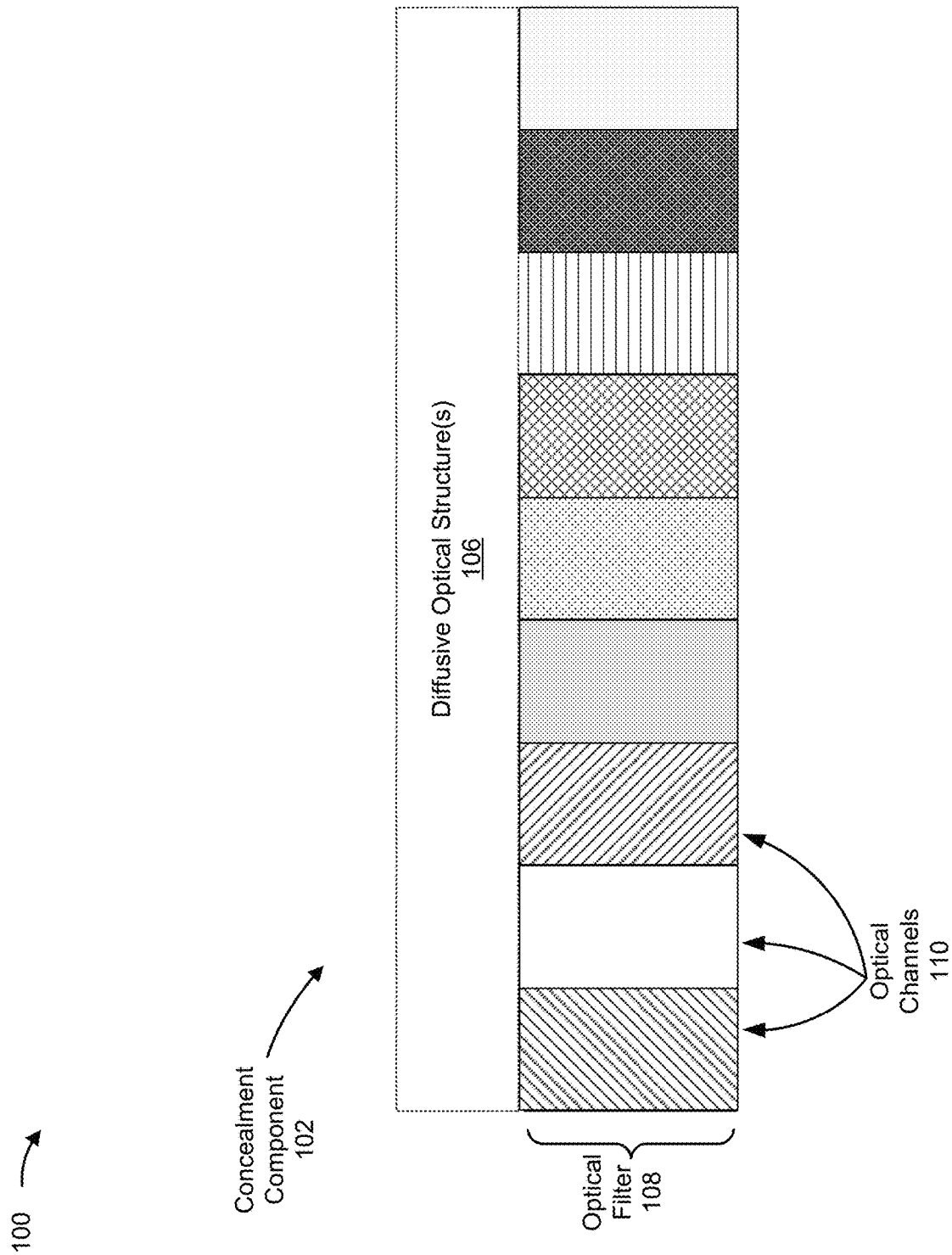

FIGS. 1A-1C are diagrams of an example implementation 100 described herein. As shown in FIGS. 1A-1C, example implementation 100 includes a concealment component 102. The concealment component 102 may be configured to conceal (e.g., disguise, mask, and/or camouflage) an optical sensor (e.g., optical sensor 204, as described herein in relation to FIG. 2), as further described herein. For example, the concealment component 102 may cover the optical sensor and direct and absorb light that impinges on the concealment component 102 in a concealment pattern that reduces a likelihood that the optical sensor is detected by an observer (e.g., a human observer, a smart camera device, or another device) of the concealment component 102. As shown in FIG. 1A, the concealment component 102 may include a substrate 104, one or more diffusive optical structures 106, and/or an optical filter 108.

The substrate 104 may be a glass substrate, a polymer substrate, a silicon substrate, or a germanium substrate, among other examples. The substrate 104 may be a substrate on which the one or more diffusive optical structures 106 and/or the optical filter 108 are formed. As further shown in FIG. 1A, the one or more diffusive optical structures 106 may be disposed on a first surface (e.g., a top surface) of the substrate 104 and the optical filter 108 may be disposed on a second surface (e.g., a bottom surface) of the substrate 104. The first surface and the second surface of the substrate 104 may be substantially parallel to each other (e.g., parallel within a tolerance, which may be less than or equal to 1 degree, 2 degrees, or 3 degrees, for example).

The one or more diffusive optical structures 106 may include an optical diffuser (e.g., a circular optical diffuser, a square optical diffuser, a rectangular optical diffuser, a line optical diffuser, or another optical diffuser), a reflective optical element, a diffractive optical element, a refractive optical element, and/or any other type of optical structure to diffuse light (e.g., cause light to scatter in two or more directions). For example, the one or more diffusive optical structures 106 may be configured to diffuse and distribute light (e.g., that originates at a scene, such as scene 304 as described herein in relation to FIG. 3) across an input surface (e.g., a top surface) of the optical filter 108. Accordingly, the one or more diffusive optical structures 106 may be configured to distribute the light in a diffused pattern on the input surface of the optical filter 108. The diffused pattern may have a circular distribution pattern, an elliptical distribution pattern, or a Gaussian distribution pattern, among other examples, and a Gaussian intensity profile, a flat top intensity profile, or a bat wing intensity profile, among other examples. In some implementations, the one or more diffusive optical structures 106 may be configured to diffuse and distribute other light (e.g., that has been directed away from the optical filter 108 by the optical filter 108, as further described herein in relation to FIG. 3) in a diffused pattern away from the concealment component 102.

The one or more diffusive optical structures 106 may be formed on the substrate 104. For example, the one or more diffusive optical structures 106 may be formed using a formation process (e.g., that includes etching, polymer replication, polymer injection-molding, polymer-on-glass patterning, and/or another formation process) on the first surface of the substrate 104.

The optical filter 108 may include one or more optical channels 110. The one or more optical channels 110 may be arranged in a periodic pattern, such as a one-dimensional or a two-dimensional array, on a surface of the optical filter 108. For example, as shown in FIG. 1A, the one or more optical channels 110 may be arranged in a one- or two-dimensional array that includes 8 optical channels 110 in a row. In some implementations, the one or more optical channels 110 may be arranged in a non-periodic pattern, such as a spiral optical channel formation, a random optical channel formation, or a pseudo-random optical channel formation, among other examples.

The optical filter 108 may be configured to allow light associated with a particular wavelength range to pass through the optical filter. For example, the optical filter 108 may be configured to allow light associated with the particular wavelength range and that is distributed across the input surface of the optical filter (e.g., by the one or more diffusive optical structures 106 in the diffused pattern) to pass through the optical filter 108 (e.g., to the optical sensor 204, as further described herein in relation to FIG. 3B). Accordingly, at least one optical channel 110, of the one or more optical channels 110, may be configured to allow light associated with the particular wavelength range to pass through the at least one optical channel 110. For example, an optical channel 110 may be configured to pass light associated with the particular wavelength range that impinges on a region of the input surface of the optical filter 108 that is associated with the optical channel 110 (e.g., a region associated with an input surface of the optical channel 110).

In some implementations, the optical filter 108 includes a plurality of optical channels 110 that are each configured to pass light associated with the particular wavelength range. In some implementations, multiple groups of the plurality of optical channels 110 may be configured to pass light associated with respective wavelength subranges of the particular wavelength range. For example, one or more first optical channels 110, of the plurality of optical channels 110, may be configured to pass light associated with a first wavelength subrange of the particular wavelength range; one or more second optical channels 110, of the plurality of optical channels 110, may be configured to pass light associated with a second wavelength subrange of the particular wavelength range; and so on. The first wavelength subrange, the second wavelength subrange, and/or any other wavelength subranges, may span the particular wavelength range (e.g., a combination of the first wavelength subrange, the second wavelength subrange, and/or the other wavelength subranges covers the particular wavelength range).

The optical filter 108 may be configured to prevent light not associated with the particular wavelength range from passing through the optical filter. For example, the optical filter 108 may be configured to prevent light not associated with a particular wavelength range that is distributed across the input surface of the optical filter (e.g., by the one or more diffusive optical structures 106 in the diffused pattern) from passing through the optical filter 108 (e.g., to the optical sensor 204, as further described herein in relation to FIG. 3B). Accordingly, at least one optical channel 110, of the one or more optical channels 110, may be configured to reflect and/or absorb light not associated with the particular wavelength range. For example, an optical channel 110 may be configured to reflect and/or absorb light not associated with the particular wavelength range that impinges on a region of the input surface of the optical filter 108 that is associated with the optical channel 110 (e.g., a region associated with an input surface of the optical channel 110). That is, the optical channel 110 may be configured to reflect one or more first portions of the light not associated with the particular wavelength range and/or to absorb one or more second portions of the light not associated with the particular wavelength range.

In some implementations, the optical filter 108 includes a plurality of optical channels 110 that are each configured to reflect light associated with at least one wavelength range that does not overlap with the particular wavelength range. For example, one or more first optical channels 110, of the plurality of optical channels 110, may be configured to reflect light associated with a first other wavelength range that does not overlap with the particular wavelength range; one or more second optical channels 110, of the plurality of optical channels 110, may be configured to reflect light associated with a second other wavelength range that does not overlap with the particular wavelength range; and so on. The first wavelength range, the second wavelength range, and/or any other wavelength range reflected by one or more other optical channels 110 may be different (e.g., may cover discrete wavelength ranges and/or partially overlapping wavelength ranges) or may be the same (e.g., may cover coextensive wavelength ranges).

In some implementations, the optical filter 108 includes a plurality of optical channels 110 that are each configured to absorb light associated with at least one wavelength range that does not overlap with the particular wavelength range. For example, one or more first optical channels 110, of the plurality of optical channels 110, may be configured to absorb light associated with a first other wavelength range that does not overlap with the particular wavelength range; one or more second optical channels 110, of the plurality of optical channels 110, may be configured to absorb light associated with a second other wavelength range that does not overlap with the particular wavelength range; and so on. The first wavelength range, the second wavelength range, and/or any other wavelength range absorbed by one or more other optical channels 110 may be different (e.g., may cover discrete wavelength ranges and/or partially overlapping wavelength ranges) or may be the same (e.g., may cover coextensive wavelength ranges).

Figure 3A:
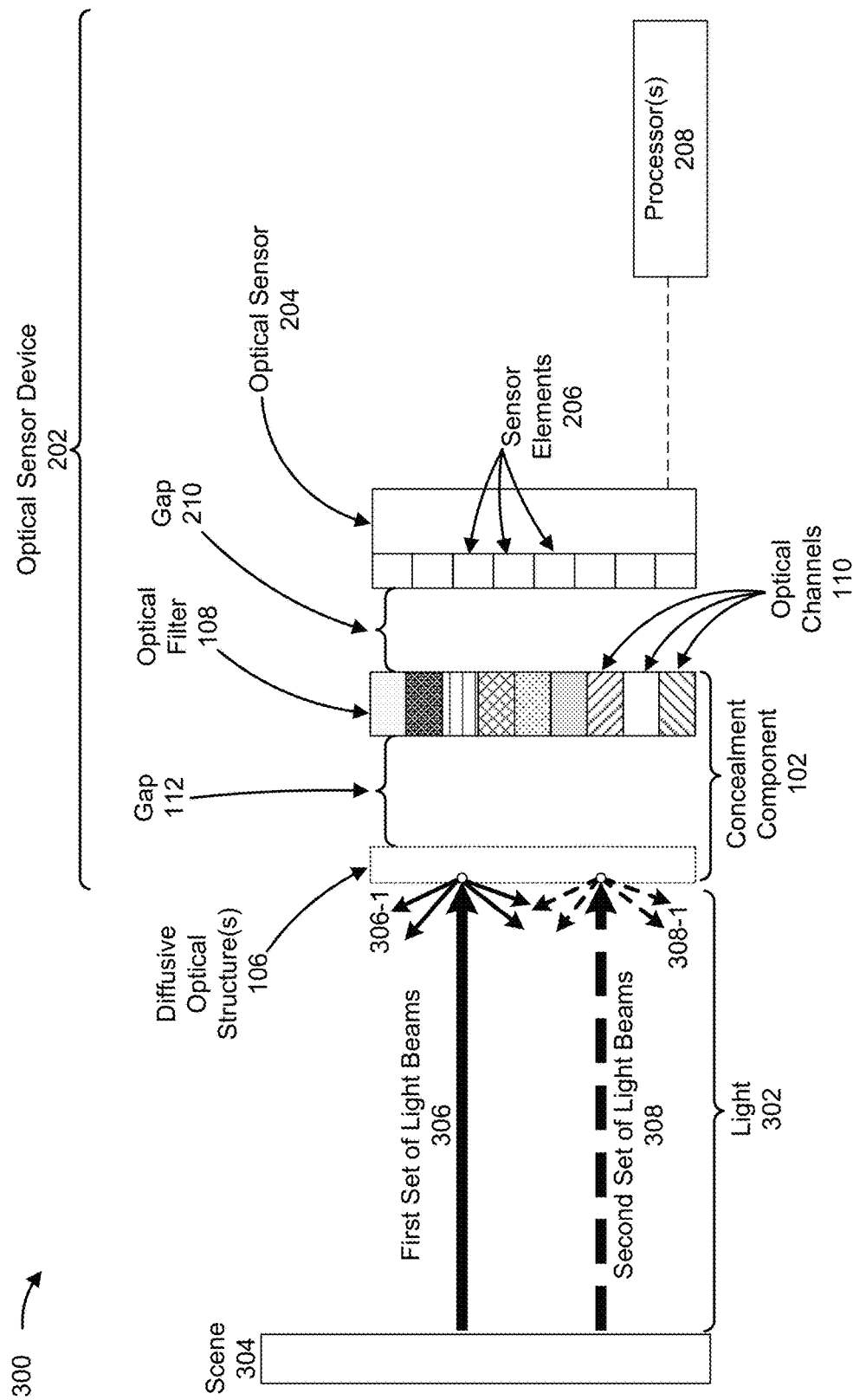
FIGS. 3A-3B are diagrams of an example implementation described herein.
Figure 4A:
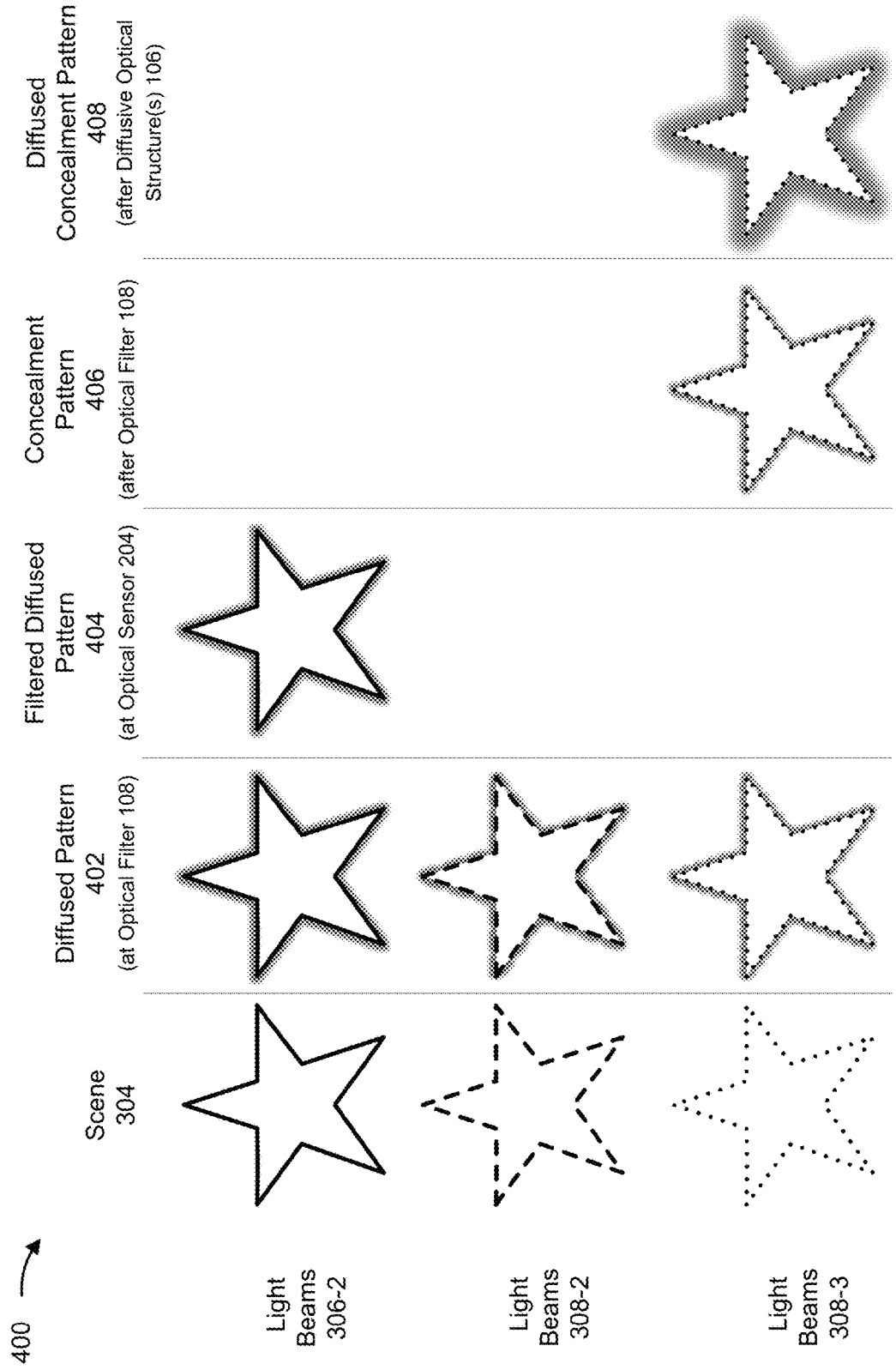
FIGS. 4A-4B are diagrams of examples related to a concealment pattern and a diffused concealment pattern described herein.
Figure 4B:
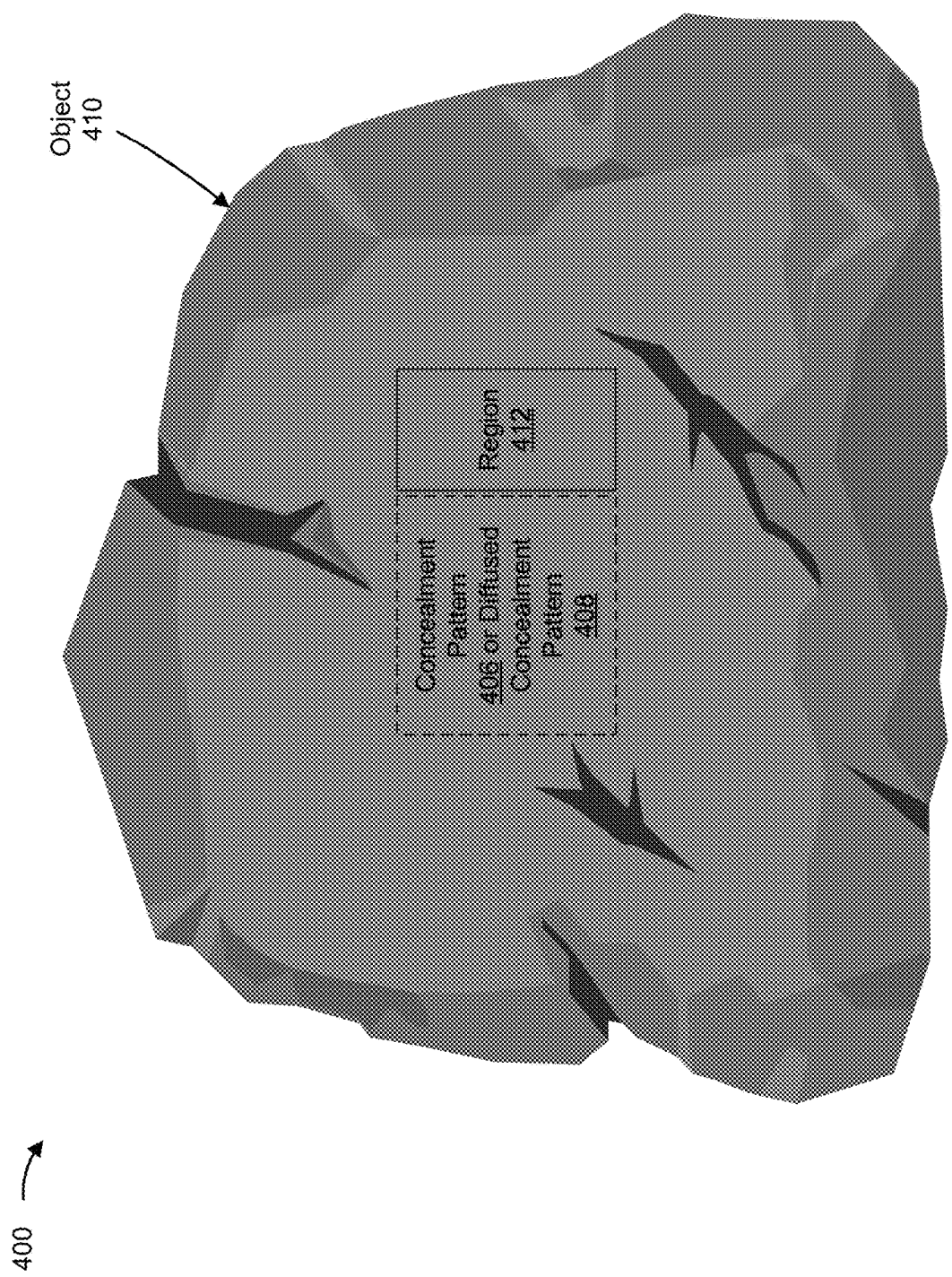

In some implementations, the optical filter 108 preventing light not associated with the particular wavelength range from passing through the optical filter may cause one or more portions of the light (e.g., that is reflected by optical filter 108) to be directed away from or absorbed by the input surface of the optical filter 108 in a concealment pattern, as further described herein in relation to FIGS. 3A, 4A, and 4B.

FIGS. 1B-1C show other example configurations of the concealment component 102 (e.g., that do not include the substrate 104). As shown in FIG. 1B, the one or more diffusive optical structures 106 and the optical filter 108 may be separated by a gap 112. Accordingly, the one or more diffusive optical structures 106 may be adjacent to the optical filter 108, but do not contact the optical filter 108 (e.g., to allow one or more other optical filters and/or additional components of the concealment component 102 to be disposed between the one or more diffusive optical structures 106 and the optical filter 108). As shown in FIG. 1C, the one or more diffusive optical structures 106 may be disposed directly on the optical filter 108 (e.g., without any gap between the one or more diffusive optical structures 106 and the optical filter 108).

As indicated above, FIGS. 1A-1C are provided as one or more examples. Other examples may differ from what is described with regard to FIGS. 1A-1C.

Figure 2:
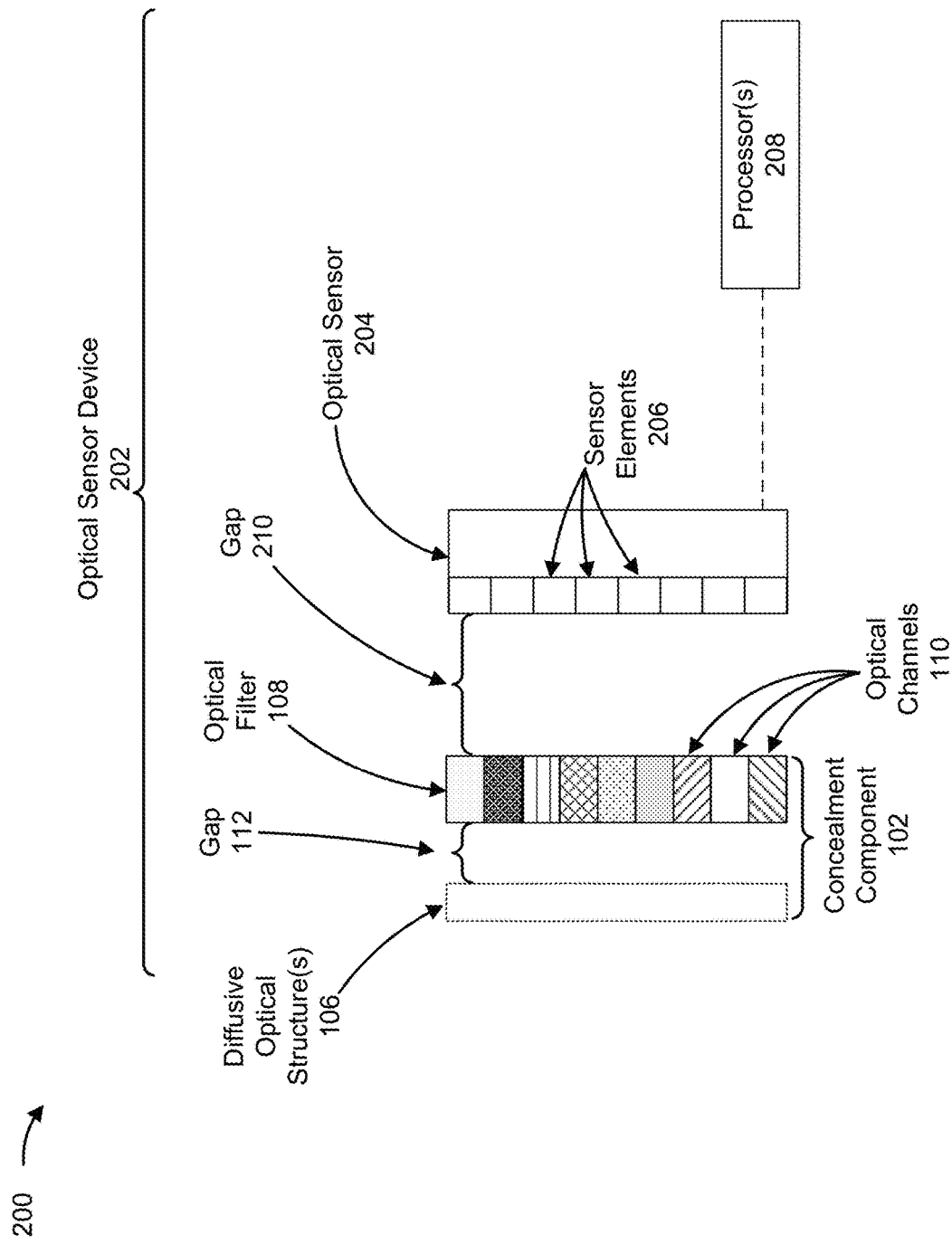
FIG. 2 is a diagram of an example implementation described herein.

FIG. 2 is a diagram of an example implementation 200 described herein. As shown in FIG. 2, example implementation 200 includes an optical sensor device 202 (e.g., that is configured to obtain spectral information and/or image information associated with a scene, as further described herein in relation to FIGS. 3A-3B). As shown in FIG. 2, the optical sensor device 202 may include the concealment component 102, an optical sensor 204 (e.g., the comprises a plurality of sensor elements 206), and/or one or more processors 208.

The optical sensor 204 may include the plurality of sensor elements 206 that are each configured to obtain information. For example, a sensor element 206 may provide an indication of intensity of light that impinges on the sensor element 206 (e.g., active/inactive or a more granular indication of intensity). As another example, a sensor element 206 may provide an indication of a wavelength or wavelength range of light that impinges on the sensor element 206. The optical sensor 204 may be configured to collect the information obtained by the plurality of sensor elements 206 to generate sensor data, which the optical sensor 204 provides to the one or more processors 208 for further processing (e.g., as described herein in relation to FIG. 3B).

The plurality of sensor elements 206 may be arranged in a periodic pattern, such as a one-dimensional or a two-dimensional array, on a surface of the optical sensor 204. In some implementations, an arrangement of the plurality of sensor elements 206 on the surface of the optical sensor 204 may correspond to an arrangement of the one or more optical channels 110 on the surface of the optical filter 108, such that an optical channel 110 may be configured to pass light associated with a particular wavelength range to one or more sensor elements 206.

As further shown in FIG. 2, the concealment component 102 may be disposed adjacent to the optical sensor 204 (e.g., within the optical sensor device 202). For example, the concealment component 102 may be disposed adjacent to the optical sensor 204 to allow light that is diffused by the one or more diffusive optical structures 106 and passed by the optical filter 108 to transmit to at least some of the plurality of sensor elements of the optical sensor 204. As further shown in FIG. 2, the concealment component 102 and the optical sensor 204 may be separated by a gap 210 (e.g., to allow one or more other optical filters and/or additional components of the optical sensor device 202 to be disposed between the concealment component 102 and the optical sensor 204). Accordingly, the concealment component 102 and the optical sensor 204 may not contact each other. Alternatively, the concealment component 102 may be disposed directly on the optical sensor 204 (e.g., such that an output surface of the optical filter 108 contacts an input surface of the optical sensor 204).

As indicated above, FIG. 2 is provided as one or more examples. Other examples may differ from what is described with regard to FIG. 2.

Figure 3B:
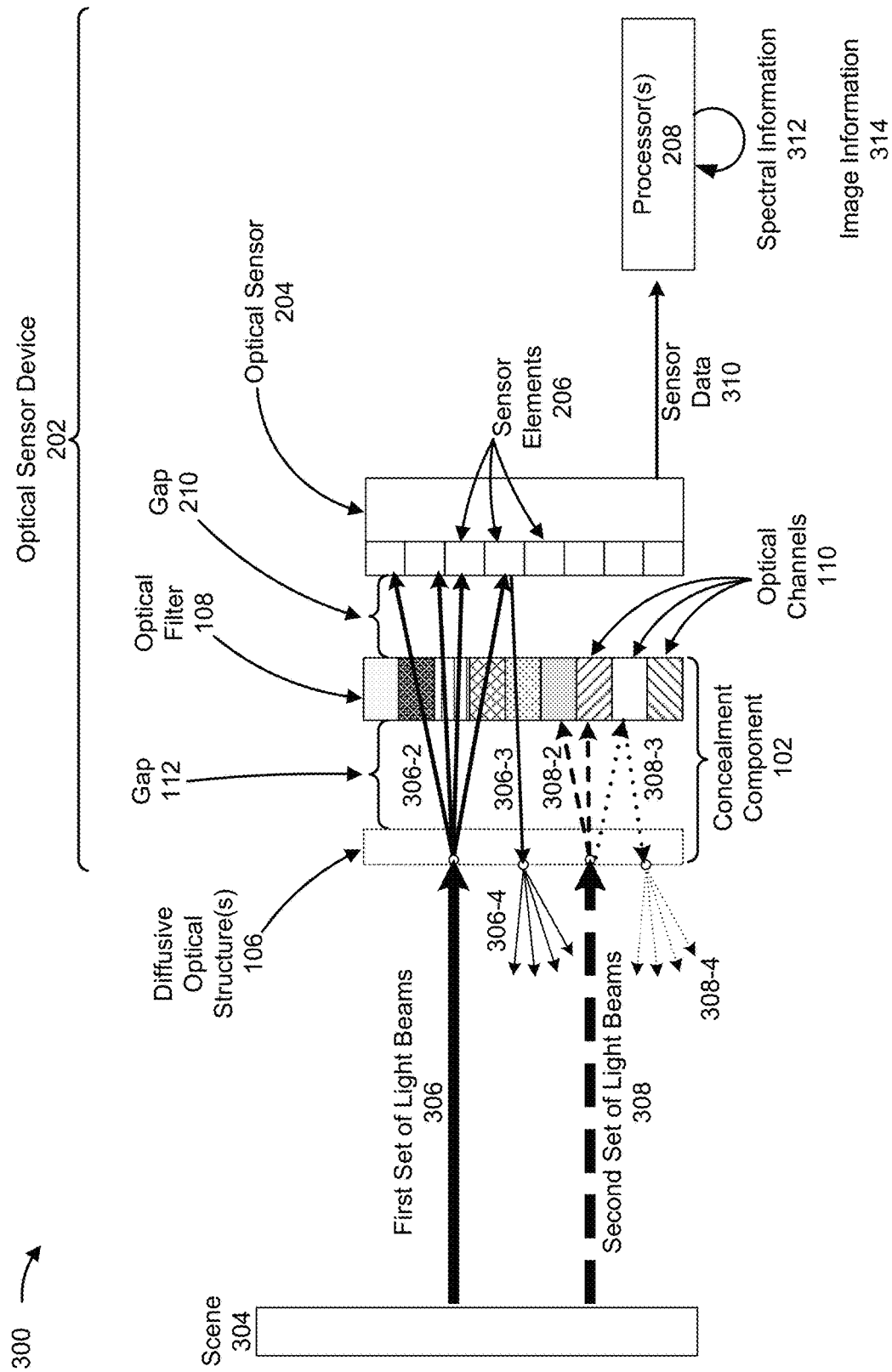

FIGS. 3A-3B are diagrams of an example implementation 300 described herein. As shown in FIGS. 3A-3B, light 302 may originate from a scene 304 (e.g., a scene that is to be analyzed by the optical sensor device 202). The light 302 may include a first set of light beams 306 that are associated with a particular wavelength range (e.g., a wavelength range that the optical sensor device 202 is configured to detect and/or analyze, such as infrared light) and a second set of light beams 308 that are not associated with the particular wavelength range (e.g., a wavelength range that the optical sensor device 202 is not configured to detect and/or analyze, such as visible light).

The light 302 may transmit to the concealment component 102 of the optical sensor device and may thereby impinge on the one or more diffusive optical structures 106. The one or more diffusive optical structures may diffuse and reflect a first portion of the light 302 in a diffused pattern away from the one or more diffusive optical structures 106. For example, as shown in FIG. 3A, the diffusive optical structures 106 may reflect a first portion of the first set of light beams 306 (to simplify what is illustrated in FIG. 3A, only a few light beams 306-1 of the reflected portion of the first set of light beams 306 are shown) away from the one or more diffusive optical structures 106 and/or may diffuse and reflect a first portion of the second set of light beams 308 (to simplify what is illustrated in FIG. 3A, only a few light beams 308-1 of the reflected portion of the second set of light beams 306 are shown) away from the one or more diffusive optical structures 106.

Further, the one or more diffusive optical structures 106 may distribute a second portion of the light 302 in a diffused pattern on the input surface of the optical filter 108. For example, as shown in FIG. 3B, the one or more diffusive optical structures 106 may diffuse and distribute a second portion of the first set of light beams 306 in a diffused pattern on the input surface of the optical filter 108 (to simplify what is illustrated FIG. 3B, only a few light beams 306-2 of the diffused and distributed portion of the first set of light beams 306 are shown). As another example, as further shown in FIG. 3B, the one or more diffusive optical structures 106 may diffuse and distribute a second portion of the second set of light beams 308 in a diffused pattern on the input surface of the optical filter 108 (to simplify what is illustrated FIG. 3B, only a few light beams 308-2 and 308-3 of the diffused and distributed portion of the second set of light beams 306 are shown).

The optical filter 108 may allow the second portion of the first set of light beams 306 to pass through the optical filter 108. For example, as shown in FIG. 3B, a subset of light beams (e.g., that includes one or more light beams 306-2), of the second portion of the first set of light beams 306, may impinge on a region of the input surface of the optical filter 108 that is associated with an optical channel 110 of the one or more optical channels 110. The optical channel 110 may pass the subset of light beams to one or more optical sensor elements 206, of the plurality of optical sensor elements 206, of the optical sensor 204. In some implementations, a first subset of light beams of the second portion of the first set of light beams 306 (e.g., that are associated with a first wavelength subrange of the particular wavelength) may impinge on a first region of the input surface of the optical filter 108 that is associated with a first optical channel 110, which may be configured to pass light associated with the first wavelength subrange and may therefore pass the first subset of light beams; a second subset of light beams of the second portion of the first set of light beams 306 (e.g., that are associated with a second wavelength subrange of the particular wavelength) may impinge on a second region of the input surface of the optical filter 108 that is associated with a second optical channel 110, which may be configured to pass light associated with the second wavelength subrange and may therefore pass the second subset of light beams; and so on. The first wavelength subrange, the second wavelength subrange, and/or any other wavelength subranges passed by the plurality of optical channels 110 may span the particular wavelength range (e.g., a combination of the first wavelength subrange, the second wavelength subrange, and/or the other wavelength subranges covers the particular wavelength range).

The optical filter 108 may prevent the second portion of the second set of light beams 308 from passing through the optical filter 108. For example, as further shown in FIG. 3B, a subset of light beams (e.g., that includes one or more of light beams 308-2 and 308-3), of the second portion of the second set of light beams 308, may impinge on a region of the input surface of the optical filter 108 that is associated with an optical channel 110 of the one or more optical channels 110. The optical channel 110 may reflect one or more first portions of the subset of light beams (e.g., shown as light beam 308-3 in FIG. 3B). Additionally, or alternatively, the optical channel 110 may absorb one or more second portions of the subset of light beams (e.g., shown as light beams 308-2 that terminate at the input surface of the optical filter 108).

In some implementations, a first subset of light beams of the second portion of the second set of light beams 308 (e.g., that are associated with a first other wavelength range that does not overlap with the particular wavelength range) may impinge on a first region of the input surface of the optical filter 108 that is associated with a first optical channel 110, which may be configured to reflect light associated with the first other wavelength range and may therefore reflect the first subset of light beams; a second subset of light beams of the second portion of the second set of light beams 308 (e.g., that are associated with a second other wavelength range that does not overlap with the particular wavelength range) may impinge on a second region of the input surface of the optical filter 108 that is associated with a second optical channel 110, which may be configured to reflect light associated with the second other wavelength range and may therefore reflect the second subset of light beams; and so on. The first other wavelength range, the second other wavelength range, and/or any other wavelength range reflected by one or more other optical channels 110 may be different (e.g., may cover discrete wavelength ranges and/or partially overlapping wavelength ranges) or may be the same (e.g., may cover coextensive wavelength ranges).

Additionally, or alternatively, a first subset of light beams of the second portion of the second set of light beams 308 (e.g., that are associated with a first other wavelength range that does not overlap with the particular wavelength range) may impinge on a first region of the input surface of the optical filter 108 that is associated with a first optical channel 110, which may be configured to absorb light associated with the first other wavelength range and may therefore absorb the first subset of light beams; a second subset of light beams of the second portion of the second set of light beams 308 (e.g., that are associated with a second other wavelength range that does not overlap with the particular wavelength range) may impinge on a second region of the input surface of the optical filter 108 that is associated with a second optical channel 110, which may be configured to absorb light associated with the second other wavelength range and may therefore absorb the second subset of light beams; and so on. The first other wavelength range, the second other wavelength range, and/or any other wavelength range absorbed by one or more other optical channels 110, may be different (e.g., may cover discrete wavelength ranges and/or partially overlapping wavelength ranges) or may be the same (e.g., may cover coextensive wavelength ranges).

In some implementations, preventing the second portion of the second set of light beams 308 from passing through the optical filter 108 causes the second portion of the second set of light beams 308 to be directed away from or absorbed by the input surface of the optical filter 108 in a concealment pattern (e.g., that is perceptible to an observer of the concealment component 102, the optical sensor 204, and/or the optical sensor device 202). Further, the one or more diffusive optical structures 106 may further distribute one or more subportions of the second portion of the second set of light beams 308 in a diffused concealment pattern (e.g., that is perceptible to the observer of the concealment component 102, the optical sensor 204, and/or the optical sensor device 202) away from the concealment component 102. For example, as further shown in FIG. 3B, the reflected light beam 308-3 is diffused and directed away from the concealment component 102 as a plurality of light sub-beams 308-4 that comprise the diffused concealment pattern. In some implementations, the concealment pattern and/or the diffused concealment pattern may combine with the diffused and reflected first portion of the light 302 (e.g., shown in FIG. 3A), which may further conceal or otherwise reduce a likelihood that the concealment component 102, the optical sensor 204, and/or the optical sensor device 202 is perceptible to the observer of the concealment component 102, the optical sensor 204, and/or the optical sensor device 202.

As further shown in FIG. 3B, the second portion of the first set of light beams 306 may be transmitted to the plurality of optical sensor elements 206 of the optical sensor 204 (e.g., after being passed by the optical filter 108 of the concealment component 102). For example, each optical channel 110 may pass a subset of light beams, of the second portion of the first set of light beams 306, to a set of the plurality of sensor elements 206 (e.g., a set of sensor elements 206 that are configured to receive light from the optical channel 110). In this way, the plurality of sensor elements 206 may obtain information related to the second portion of the first set of light beams 306, such as an indication of intensity of the second portion of the first set of light beams 306 and/or a spatial characteristic of the second portion of the first set of light beams 306 (e.g., as distributed in the diffused pattern on the input surface of the optical filter 108 by the one or more diffusive optical structures 106).

In some implementations, a particular subset of light beams of the second portion of the first set of light beams 306 may reflect off the plurality of optical sensor elements 206 of the optical sensor 204. The particular subset of light beams (e.g., shown as light beam 306-3 in FIG. 3B) may be passed by the optical filter 108, via the one or more optical channels 110, to the one or more diffusive optical structures 106. The one or more diffusive optical structures 106 may distribute the particular subset of light beams in a diffused pattern away from the concealment component 102 (and may also cause the particular subset of light beams to be scattered in multiple directions away from the scene 304). For example, as further shown in FIG. 3B, the reflected light beam 306-3 is diffused and directed away from the concealment component 102 as a plurality of light sub-beams 306-4 that comprise the diffused pattern. In some implementations, the diffused pattern of the particular subset of light beams of the second portion of the first set of light beams 306 (e.g., plurality of light sub-beams 306-4 that comprise the diffused pattern) may combine with the diffused and reflected first portion of the first set of light beams 306 of the light 302 (e.g., shown as light beams 306-1 in FIG. 3A), the diffused and reflected first portion of the second set of light beams 308 of the light 302 (shown as light beams 308-1 in FIG. 3A), and/or the second portion of the second set of light beams 308 in the concealment pattern and/or the diffused concealment pattern (e.g., shown as light beams 308-2, 308-3, and 308-4 in FIG. 3A). In this way, the diffused pattern of the particular subset of light beams of the second portion of the first set of light beams 306 may further conceal or otherwise reduce a likelihood that the concealment component 102, the optical sensor 204, and/or the optical sensor device 202 is perceptible to an observer of the concealment component 102, the optical sensor 204, and/or the optical sensor device 202.

As further shown in FIG. 3B, the optical sensor 204 may provide sensor data 310 to the one or more processors 208 of the optical sensor device 202. The sensor data 310 may indicate the information related to the first set of light beams 306 (e.g., that was obtained by, and not reflected by, the plurality of sensor elements 206).

As further shown in FIG. 3B, the one or more processors 208 may process the sensor data 310 to determine spectral information 312 associated with the scene 304. For example, the one or more processors 208 may identify, based on the sensor data 310, a particular sensor element 206 of the optical sensor 204 that received at least one light beam 306 of the second portion of the first set of light beams 306. The one or more processors 208 may determine, based on configuration information associated with the optical filter 108 of the concealment component 102 (e.g., that is stored in a data structure that is accessible by the one or more processors 208), that the particular sensor element 206 is associated with a particular optical channel 110 of the optical filter 108 (e.g., the particular sensor element 206 is configured to receive light beams passed by the particular optical channel 110) and may identify the particular optical channel 110 as having passed the at least one light beam 306 to the particular sensor element 206. Further, the one or more processors 208 may determine, based on the configuration information, that the particular optical channel 110 is configured to pass light beams associated with a particular subrange of a particular wavelength range and therefore may determine that the at least one light beam 306 is associated with the particular subrange of the particular wavelength range. In this way, the one or more processors 208 may determine spectral values that indicate amounts of light associated with different subranges of different wavelength ranges that were received by the plurality of optical channels 110 and passed to the plurality of sensor elements 206.

As further shown in FIG. 3B, the one or more processors 208 may process the sensor data 310 to determine image information 314 associated with the scene 304. For example, the one or more processors 208 may identify (e.g., by searching a data structure that is stored in a data structure that is accessible by the one or more processors 208) an algorithm for constructing an image based on light diffused by the one or more diffusive optical structures 106 and may process the sensor data 310 using the algorithm to determine an image of the scene 304. In some implementations, the algorithm may be configured to construct the image of the scene 304 based on a pattern (e.g., a diffused pattern) in which the one or more diffusive optical structures 106 distribute the second portion of the first set of light beams 306 across the input surface of the optical filter 108.

In some implementations, the one or more processors 208 may cause display of the spectral information 312 and/or the image information 314 (e.g., that includes the image of the scene 304), such as on a display screen of a user device (e.g., user device 550, further described herein in relation to FIG. 5). For example, the one or more processors 208 may send the spectral information 312 and/or the image information 314 to the user device to cause the user device to display the spectral information 312 and/or the image information 314 on the display screen.

In some implementations, the one or more processors 208 may process the image information 314, such as to identify a subject of the scene 304. For example, the one or more processors 208 may process the image information 314 using object identification analysis, facial recognition analysis (e.g., when the subject is a face of a person in the scene 304), or another identification analysis technique. In some implementations, the one or more processors 208 may process the spectral information 312, such as to determine one or more characteristics of the subject of the scene 304 (e.g., a material composition of the subject of the scene 304, a temperature of the subject of the scene 304, and/or a health-related measurement of the subject of the scene 304, among other examples). The one or more processors 208 may cause display of the information identifying the subject of the scene 304 and/or the one or more characteristics of the subject of the scene 304, such as on the display screen of the user device.

As indicated above, FIGS. 3A-3B are provided as one or more examples. Other examples may differ from what is described with regard to FIGS. 3A-3B.

FIGS. 4A-4B are diagrams 400 of examples related to the concealment pattern and diffused concealment pattern described herein. FIG. 4A shows how the diffusive optical structures 106 and the optical filter 108 act on the light 302 that originates from the scene 304 to create the concealment pattern and diffused concealment pattern described herein. For example, the second portion of the first set of light beams 306 of the light 302 (e.g., shown as light beams 306-2 in FIG. 3B) may originate at the scene 304, may be distributed by the diffusive optical structures 106 in a diffused pattern 402 on the input surface of the optical filter 108, and may be passed by the optical filter 108 in a filtered diffused pattern 404 on the input surface of the optical sensor 204. As another example, the first subset of the second portion of the second set of light beams 308 of the light 302 (shown as light beams 308-2 in FIG. 3B) may originate at the scene 304, may be distributed by the diffusive optical structures 106 in a diffused pattern 402 on the input surface of the optical filter 108, and may be absorbed by the optical filter 108. In an additional example, the second subset of the second portion of the second set of light beams 308 of the light 302 (shown as light beams 308-3 in FIG. 3B) may originate at the scene 304, may be distributed by the diffusive optical structures 106 in a diffused pattern 402 on the input surface of the optical filter 108, and may be reflected by the optical filter 108 in the concealment pattern 406. Some or all of the second subset of the second portion of the second set of light beams 308, after being reflected to form the concealment pattern 406, may be distributed by the diffusive optical structures 106 in a diffused concealment pattern 408 away from the diffusive optical structures 106.

In some implementations, the second subset of the second portion of the second set of light beams 308, in the concealment pattern 406 or the diffused concealment pattern 408, may combine with the diffused and reflected first portion of the first set of light beams 306 of the light 302 (shown as light beams 306-1 in FIG. 3A), the diffused and reflected first portion of the second set of light beams 308 of the light 302 (shown as light beams 308-1 in FIG. 3A), and/or the diffused and reflected particular subset of light beams of the second portion of the first set of light beams 306 (shown as light beams 306-4 in FIG. 3B) to form a combined concealment pattern (not shown).

FIG. 4B shows an example object 410 (e.g., a rock) that includes a region 412 (e.g., an external surface region of the rock). The optical sensor device 202 (e.g., that includes the concealment component 102 and the optical sensor 204) may be disposed adjacent to the region 412 of the object 410. For example, as shown in FIG. 4B, the optical sensor device 202 may be disposed within an internal portion of the object 410, wherein the concealment component 102 faces an external environment and is positioned adjacent to the region 412. Other configurations are possible, such as the optical sensor device 202 being positioned next to the region 412 of the object 410.

The region 412 may cause one or more portions of light beams that are not associated with the particular wavelength (e.g., that the optical filter 108 is configured to pass), of other light associated with the scene 304 (e.g., light that originates from the scene 304) that transmits to and impinges on the region 412, to be directed or absorbed by the region 412 in an unconcealed pattern. For example, when the particular wavelength is infrared light, the region 412 may cause light beams associated with visual light associated with the scene to be directed or absorbed by the region 412 in an unconcealed pattern (e.g., that appears as a color and shade pattern to a human observer of the region 412).

In some implementations, the concealment component 102 may cause the second subset of the second portion of the second set of light beams 308 (e.g., light beams 308-3) to appear in the concealment pattern 406 or the diffused concealment pattern 408, which may match the unconcealed pattern of the one or more portions of light beams of the other light. In relation to the previous example, the concealment component 102 may cause light beams associated with visual light associated with the scene to be directed or absorbed by the concealment component 102 in the concealment pattern 406 and/or the diffused concealment pattern 408, which may match the unconcealed pattern of the light beams associated with the region 412 (e.g., the light beams associated with the concealment component 102 may appear, to a human observer, to have a same or similar color and shade pattern as that of the light beams associated with the region 412).

Accordingly, the concealment pattern 406 and/or the diffused concealment pattern 408 conceal or otherwise reduce a likelihood that the concealment component 102, the optical sensor 204, and/or the optical sensor device 202 is perceptible to the observer (e.g., when the observer is viewing the object 410). Further the light beams associated with the concealment component 102 in the concealment pattern 406 and/or the diffused concealment pattern 408 may further combine with additional light reflected by the diffusive optical structures 106 of the concealment component, which may further conceal or otherwise reduce a likelihood that the concealment component 102, the optical sensor 204, and/or the optical sensor device 202 are perceptible to the observer.

Additionally, or alternatively, when the concealment component 102 causes the second subset of the second portion of the second set of light beams 308 (e.g., light beams 308-3) to appear in the diffused concealment pattern 408, the concealment component 102 may cause a threshold amount of the second subset of the second portion of the second set of light beams 308 to be scattered in multiple directions away from the scene 304 (e.g., the source of the light 302 that includes the second subset of the second portion of the second set of light beams 308). The threshold amount may be for example a particular percentage (e.g., of the second subset of the second portion of the second set of light beams 308), which may be greater than or equal to, for example, 50%, 65%, 75%, 90%, 95%, or 99%. Accordingly, an observer associated with the scene, such as a detection device positioned at the scene 304 that emits the light 302 to detect optical devices, may be less likely to detect the concealment component 102, the optical sensor 204, and/or the optical sensor device 202 (e.g., because an insufficient amount of the second subset of the second portion of the second set of light beams 308 is directed toward the scene 304 by the concealment component 102 to allow for detection by the observer).

As indicated above, FIGS. 4A-4B are provided as one or more examples. Other examples may differ from what is described with regard to FIGS. 4A-4B.

FIG. 5 is a diagram of an example environment 500 in which systems and/or methods described herein may be implemented. As shown in FIG. 5, environment 500 may include an optical sensor device 510 that may include one or more processors 520 (e.g., that correspond to the one or more processors 208 described elsewhere herein), an optical sensor 530 (e.g., that corresponds to the optical sensor 204 described elsewhere herein), and a concealment component 540 (e.g., that corresponds to the concealment component 102 described elsewhere herein). The environment 500 may also include a user device 550 and a network 560. Devices of environment 500 may interconnect via wired connections, wireless connections, or a combination of wired and wireless connections.

Optical sensor device 510 may include an optical device capable of storing, processing, and/or routing spectral information and/or image information associated with a scene. For example, optical sensor device 510 may include a spectrometer device that performs spectroscopy, such as a spectral optical sensor device (e.g., a binary multispectral optical sensor device that performs vibrational spectroscopy, such as a near infrared (NIR) spectrometer, a mid-infrared spectroscopy (mid-IR), Raman spectroscopy, and/or the like). In some implementations, optical sensor device 510 may be incorporated into user device 550, such as a wearable spectrometer and/or the like. In some implementations, optical sensor device 510 may receive information from and/or transmit information to another device in environment 500, such as user device 550.

In some implementations, optical sensor device 510 may comprise a spectral imaging camera. A spectral imaging camera is a device that can capture an image of a scene. A spectral imaging camera (or a processor 520 associated with the spectral imaging camera) may be capable of determining spectral content or changes in spectral content at different points in an image of a scene, such as any point in an image of a scene. In some implementations, optical sensor device 510 may comprise a spectral imaging camera capable of performing hyperspectral imaging. For example, optical sensor device 510 may include concealment component 540, which may include an optical filter (e.g., optical filter 108, described elsewhere herein). In some implementations, concealment component 540, and therefore the optical filter, may be disposed over optical sensor 530. Concealment component 540 may conceal optical sensor 530 and/or one or more other parts of optical sensor device 510, as described elsewhere herein.

Optical sensor device 510 may include one or more processors 520, described in more detail in connection with FIG. 6.

Optical sensor device 510 may include an optical sensor 530. Optical sensor 530 includes a device capable of sensing light. For example, optical sensor 530 may include an image sensor, a multispectral sensor, a spectral sensor, and/or the like. In some implementations, optical sensor 530 may include a silicon (Si) based sensor, an indium-gallium-arsenide (InGaAs) based sensor, a lead-sulfide (PbS) based sensor, or a germanium (Ge) based sensor, and may utilize one or more sensor technologies, such as a complementary metal-oxide-semiconductor (CMOS) technology, or a charge-coupled device (CCD) technology, among other examples. In some implementations, optical sensor 530 may include a front-side illumination (FSI) sensor, a back-side illumination (BSI) sensor, and/or the like. In some implementations, optical sensor 530 may be included in a camera of optical sensor device 510 and/or user device 550.

User device 550 includes one or more devices capable of receiving, generating, storing, processing, and/or providing the spectral information and/or the image information associated with the scene. For example, user device 550 may include a communication and/or computing device, such as a mobile phone (e.g., a smart phone, a radiotelephone, and/or the like), a computer (e.g., a laptop computer, a tablet computer, a handheld computer, and/or the like), a gaming device, a wearable communication device (e.g., a smart wristwatch, a pair of smart eyeglasses, and/or the like), or a similar type of device. In some implementations, user device 550 may receive information from and/or transmit information to another device in environment 500, such as optical sensor device 510.

Network 560 includes one or more wired and/or wireless networks. For example, network 560 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. For example, although optical sensor device 510 and user device 550 are described as separate devices, optical sensor device 510 and user device 550 may be implemented as a single device. Additionally, or alternatively, a set of devices (e.g., one or more devices) of environment 500 may perform one or more functions described as being performed by another set of devices of environment 500.

Figure 6:
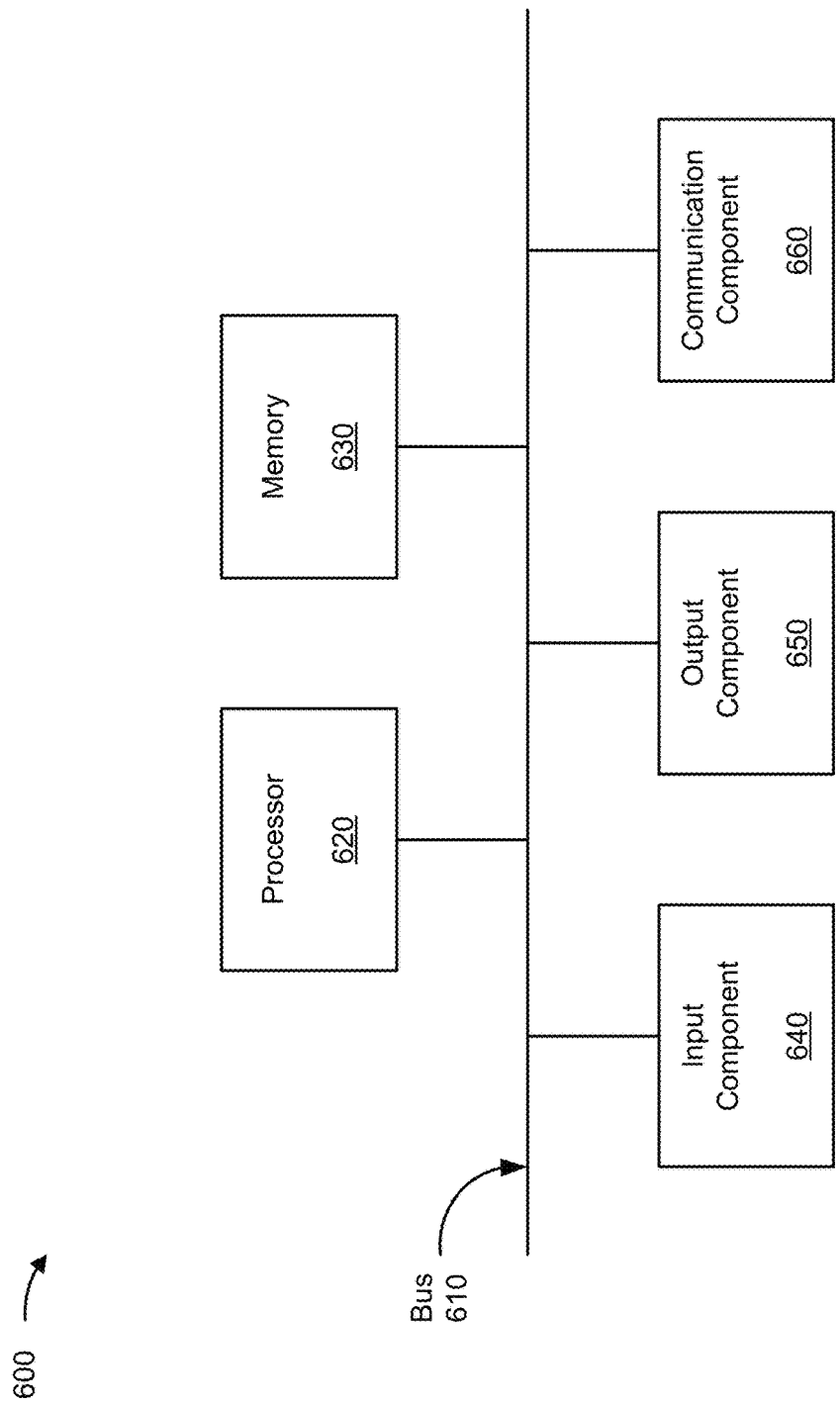
FIG. 6 is a diagram of example components of one or more devices of FIG. 5.

FIG. 6 is a diagram of example components of a device 600, which may correspond to optical sensor device 510 and/or user device 550. In some implementations, optical sensor device 510 and/or user device 550 include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
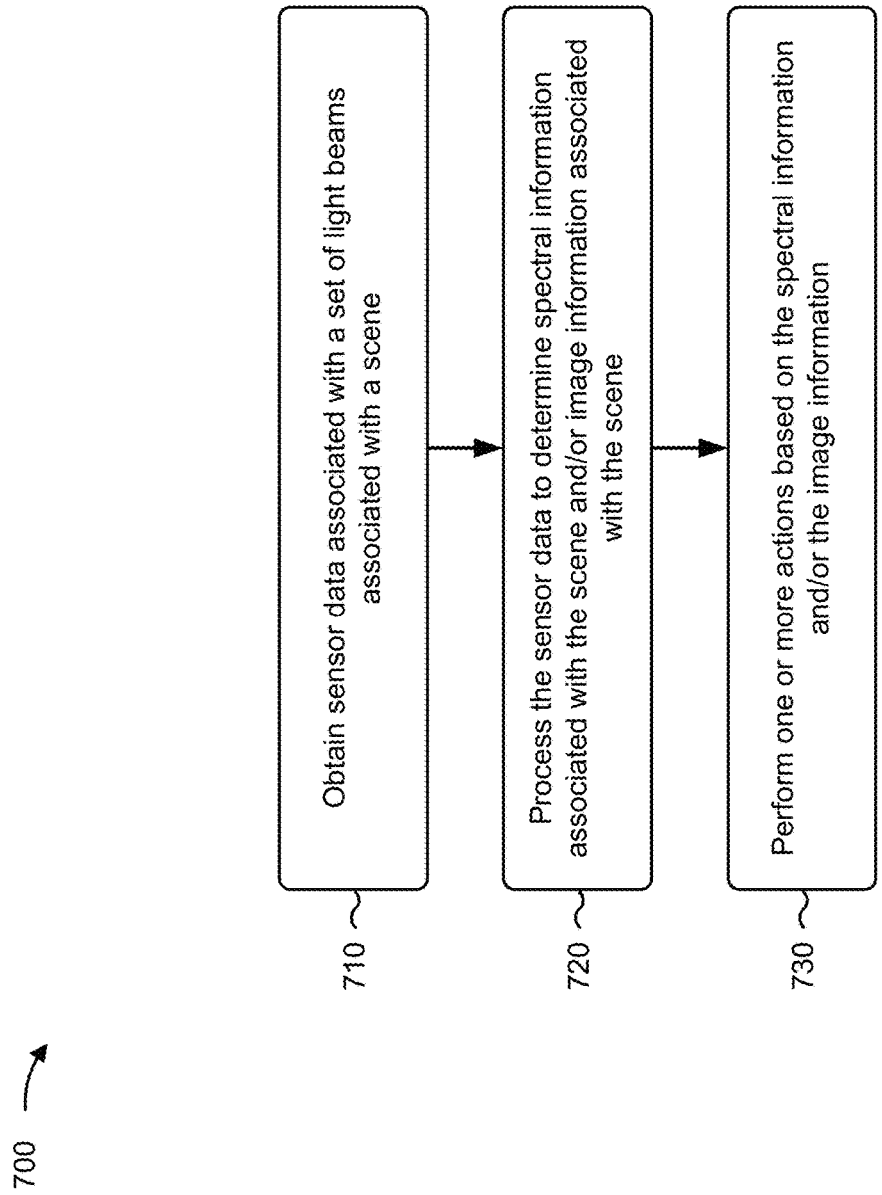
FIG. 7 is a flowchart of example processes relating to an optical sensor device described herein.

FIG. 7 is a flowchart of an example process 700 associated with an optical sensor device (e.g., optical sensor device 202 or optical sensor device 510). In some implementations, one or more process blocks of FIG. 7 may be performed by one or more processors (e.g., one or more processors 208 or one or more processors 520) of the optical sensor device. In some implementations, one or more process blocks of FIG. 7 may be performed by another device or a group of devices separate from or including the one or more processors, such as a user device (e.g., user device 550). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include obtaining sensor data associated with a set of light beams associated with a scene (block 710). For example, the one or more processors may obtain sensor data associated with a set of light beams associated with a scene, as described above.

As further shown in FIG. 7, process 700 may include processing the sensor data to determine spectral information associated with the scene and/or image information associated with the scene (block 720). For example, the one or more processors may process the sensor data to determine spectral information associated with the scene and/or image information associated with the scene, as described above.

As further shown in FIG. 7, process 700 may include performing one or more actions based on the spectral information and/or the image information (block 730). For example, the one or more processors may perform one or more actions based on the spectral information and/or the image information, as described above. The one or more actions may include causing display of the spectral information and/or the image information, identifying a subject of the scene, determining one or more characteristics of the subject of the scene, and/or causing display of information identifying the subject of the scene and/or the one or more characteristics of the subject of the scene.

Process 700 may include additional implementations, such as any single implementation or any combination of implementations described in connection with one or more other processes described elsewhere herein.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical sensor device, comprising:
   an optical sensor that includes a plurality of sensor elements;

a concealment component that includes:
an optical filter, and
one or more diffusive optical structures that include one or more of a circular optical diffuser, a square optical diffuser, a rectangular optical diffuser, a reflective optical element, a diffractive optical element, or a refractive optical element; and
one or more processors, wherein:
the one or more diffusive optical structures of the concealment component are configured to distribute light associated with a scene in a diffused pattern on an input surface of the optical filter,
the optical filter is configured to:
allow a first set of light beams, of the light distributed in the diffused pattern on the input surface of the optical filter, that are associated with a particular wavelength range to pass through the optical filter to the plurality of sensor elements of the optical sensor, and
reflect one or more portions of a second set of light beams, of the light distributed in the diffused pattern on the input surface of the optical filter, that are not associated with the particular wavelength range, away from the input surface of the optical filter, and
the one or more diffusive optical structures are further configured to distribute the one or more portions of the second set of light beams, after being reflected away from the input surface of the optical filter, in a diffused concealment pattern away from the concealment component.

2. The optical sensor device of claim 1, wherein the one or more diffusive optical structures are configured to reflect a portion of the light in a diffused pattern away from the one or more diffusive optical structures.

3. The optical sensor device of claim 1, wherein:
the optical sensor device is to be disposed adjacent to a region of an object,
wherein the region of the object is to cause one or more portions of third light beams, of other light associated with the scene that impinges on the region of the object, that are not associated with the particular wavelength range to be directed away from or absorbed by the region of the object in an unconcealed pattern; and
the diffused concealment pattern, of the one or more portions of the second set of light beams, is to match the unconcealed pattern of the one or more portions of the third light beams.

4. The optical sensor device of claim 1, wherein the optical filter includes one or more optical channels, wherein:
a first subset of light beams, of the first set of light beams, are to impinge on a region of the input surface of the optical filter that is associated with an optical channel of the one or more optical channels;
a second subset of light beams, of the second set of light beams, are to impinge on the region of the input surface of the optical filter; and
the optical channel is configured to at least one of:
pass, to a set of the plurality of sensor elements of the optical sensor, the first subset of light beams,
reflect one or more first portions of the second subset of light beams, or
absorb one or more second portions of the second subset of light beams.

5. The optical sensor device of claim 1, wherein the optical filter includes a plurality of optical channels, wherein:
a first optical channel, of the plurality of optical channels, is configured to pass a first subset of light beams, of the first set of light beams, that are associated with a first wavelength subrange of the particular wavelength range; and
a second optical channel, of the plurality of optical channels, is configured to pass a second subset of light beams, of the first set of light beams, that are associated with a second wavelength subrange of the particular wavelength range,
wherein the first wavelength subrange and the second wavelength subrange are different.

6. The optical sensor device of claim 1, wherein the optical filter includes a plurality of optical channels, wherein:
a first optical channel, of the plurality of optical channels, is configured to reflect a first subset of light beams, of the second set of light beams, that are associated with a first other wavelength range that does not overlap with the particular wavelength range; and
a second optical channel, of the plurality of optical channels, is configured to reflect a second subset of light beams, of the second set of light beams, that are associated with a second other wavelength range that does not overlap with the particular wavelength range,
wherein the first other wavelength range and the second other wavelength range are different.

7. The optical sensor device of claim 1, wherein the optical filter includes a plurality of optical channels, wherein:
a first optical channel, of the plurality of optical channels, is configured to absorb a first subset of light beams, of the second set of light beams, that are associated with a first other wavelength range that does not overlap with the particular wavelength range; and
a second optical channel, of the plurality of optical channels, is configured to absorb a second subset of light beams, of the second set of light beams, that are associated with a second other wavelength range that does not overlap with the particular wavelength range,
wherein the first other wavelength range and the second other wavelength range are different.

8. The optical sensor device of claim 1, wherein the one or more processors are configured to:
obtain, from the optical sensor, sensor data associated with the first set of light beams;
process the sensor data to determine image information associated with the scene; and
perform one or more actions based on the image information associated with the scene.

9. The optical sensor device of claim 1, wherein the one or more processors are configured to:
obtain, from the optical sensor, sensor data associated with the first set of light beams;
process the sensor data to determine spectral information associated with the scene; and
perform one or more actions based on the spectral information associated with the scene.

10. An optical sensor device, comprising:
an optical sensor that includes a plurality of sensor elements; and
a concealment component that includes:
an optical filter, and one or more diffusive optical structures that include one or more of a circular optical diffuser, a square optical diffuser, a rectangular optical diffuser, a reflective optical element, a diffractive optical element, or a refractive optical element, wherein:
the one or more diffusive optical structures of the concealment component are configured to distribute light associated with a scene in a diffused pattern on an input surface of the optical filter, the optical filter is configured to:
pass a first set of light beams, of the light distributed in the diffused pattern on the input surface of the optical filter, that are associated with a particular wavelength range to the plurality of sensor elements of the optical sensor, and reflect one or more portions of a second set of light beams, of the light distributed in the diffused pattern on the input surface of the optical filter, that are not associated with the particular wavelength range, away from the input surface of the optical filter, and the one or more diffusive optical structures are further configured to distribute the one or more portions of the second set of light beams, after being reflected away from the input surface of the optical filter, in a diffused concealment pattern away from the concealment component.

11. The optical sensor device of claim 10, wherein the optical filter includes one or more optical channels, wherein:
a first subset of light beams, of the first set of light beams, are to impinge on a region of the input surface of the optical filter that is associated with an optical channel of the one or more optical channels;

a second subset of light beams, of the second set of light beams, are to impinge on the region of the input surface of the optical filter; and the optical channel is configured to at least one of:
pass, to a set of the plurality of sensor elements of the optical sensor, the first subset of light beams, reflect one or more first portions of the second subset of light beams, or absorb one or more second portions of the second subset of light beams.

12. The optical sensor device of claim 10, wherein the concealment component is disposed directly on the optical sensor.

13. The optical sensor device of claim 10, wherein the concealment component does not contact the optical sensor.

14. A concealment component, comprising:
an optical filter; and
one or more diffusive optical structures that include one or more of a circular optical diffuser, a square optical diffuser, a rectangular optical diffuser, a reflective optical element, a diffractive optical element, or a refractive optical element, wherein:
the one or more diffusive optical structures of the concealment component are configured to distribute light in a diffused pattern on an input surface of the optical filter, the optical filter is configured to:
pass a first set of light beams, of the light distributed in the diffused pattern on the input surface of the optical filter, that are associated with a particular wavelength range, and reflect one or more portions of a second set of light beams, of the light distributed in the diffused pattern on the input surface of the optical filter, that are not associated with the particular wavelength range, away from the input surface of the optical filter, and the one or more diffusive optical structures are further configured to distribute the one or more portions of the second set of light beams, after being reflected away from the input surface of the optical filter, in a diffused concealment pattern away from the concealment component.

15. The concealment component of claim 14, wherein the one or more diffusive optical structures are configured to reflect a portion of the light in a diffused pattern away from the one or more diffusive optical structures.

16. The concealment component of claim 14, wherein:
the concealment component is to be disposed adjacent to a region of an object,
wherein the region of the object is to cause one or more portions of third light beams, of other light that impinges on the region of the object, that are not associated with the particular wavelength range to be directed away from or absorbed by the region of the object in an unconcealed pattern; and the diffused concealment pattern, of the one or more portions of the second set of light beams, is to match the unconcealed pattern of the one or more portions of the third light beams.

17. The concealment component of claim 14, wherein the optical filter includes one or more optical channels, wherein:
a first subset of light beams, of the first set of light beams, are to impinge on a region of the input surface of the optical filter that is associated with an optical channel of the one or more optical channels;

a second subset of light beams, of the second set of light beams, are to impinge on the region of the input surface of the optical filter; and the optical channel is configured to at least one of:
pass the first subset of light beams,
reflect one or more first portions of the second subset of light beams, or
absorb one or more second portions of the second subset of light beams.

18. The concealment component of claim 14, wherein the one or more diffusive optical structures are disposed directly on the optical filter.

19. The concealment component of claim 14, wherein the one or more diffusive optical structures are disposed on a first surface of a substrate and the optical filter is disposed on a second surface of the substrate.

20. The concealment component of claim 14, wherein the one or more diffusive optical structures do not contact the optical filter.

* * * * *